US010523736B2

(12) United States Patent
Wang et al.

(10) Patent No.: US 10,523,736 B2
(45) Date of Patent: Dec. 31, 2019

(54) DETERMINING AN ENTITY'S HIERARCHICAL RELATIONSHIP VIA A SOCIAL GRAPH

(71) Applicant: Microsoft Technology Licensing, LLC, Redmond, WA (US)

(72) Inventors: Ke Wang, Cupertino, CA (US); Songtao Guo, Cupertino, CA (US); Baoshi Yan, Belmont, CA (US); Alex Ching Lai, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 14/672,948

(22) Filed: Mar. 30, 2015

(65) Prior Publication Data

US 2015/0379113 A1 Dec. 31, 2015

Related U.S. Application Data

(60) Provisional application No. 62/018,768, filed on Jun. 30, 2014.

(51) Int. Cl.
*H04L 29/08* (2006.01)
(52) U.S. Cl.
CPC ............ *H04L 67/02* (2013.01); *H04L 67/306* (2013.01)
(58) Field of Classification Search
CPC ......... G06F 17/30598; G06F 17/30958; H04L 67/02
USPC ........................................................ 707/738
See application file for complete search history.

(56) References Cited

U.S. PATENT DOCUMENTS

| 7,499,939 | B2 * | 3/2009 | Jandhyala ......... G06F 17/30067 |
| 8,108,414 | B2 | 1/2012 | Stackpole |
| 8,606,787 | B1 * | 12/2013 | Asgekar ................. G06Q 50/01 707/737 |
| 9,049,249 | B2 * | 6/2015 | Zhang ................... H04L 67/306 |
| 9,578,094 | B1 * | 2/2017 | Ranade .................. G06Q 50/01 |
| 9,753,987 | B1 | 9/2017 | Dolan et al. |
| 9,811,866 | B1 | 11/2017 | Goldman |
| 10,044,775 | B2 | 8/2018 | Guo et al. |
| 10,074,143 | B2 | 9/2018 | Wang et al. |

(Continued)

FOREIGN PATENT DOCUMENTS

| CN | 101436191 A | 5/2009 |
| CN | 103428164 A | 12/2013 |

(Continued)

OTHER PUBLICATIONS

"International Application Serial No. PCT/US2015/023332, International Search Report dated Jul. 8, 2015", 2 pgs.

(Continued)

*Primary Examiner* — Jensen Hu
(74) *Attorney, Agent, or Firm* — Schwegman Lundberg & Woessner, P.A.

(57) ABSTRACT

Methods, systems and computer program products for identifying a relationship between sub-units of an entity are described. The sub-units are segmented into one or more candidate related groups based on one or more general attributes and a pair of the sub-units of the one or more candidate related sub-units is selected. The pair of sub-units is analyzed to determine a relationship between the sub-units and the relationship between the sub-units is identified based on the determined relationship.

15 Claims, 12 Drawing Sheets

(56) References Cited

U.S. PATENT DOCUMENTS

| | | | |
|---|---|---|---|
| 2004/0122803 A1* | 6/2004 | Dom | G06F 17/30867 |
| 2004/0128156 A1* | 7/2004 | Beringer | G06Q 10/06313 |
| | | | 705/319 |
| 2005/0137899 A1* | 6/2005 | Davies | G06F 17/3051 |
| | | | 705/1.1 |
| 2006/0085408 A1 | 4/2006 | Morsa | |
| 2006/0085455 A1 | 4/2006 | Chmura et al. | |
| 2006/0106638 A1 | 5/2006 | Brown et al. | |
| 2006/0194186 A1* | 8/2006 | Nanda | G09B 7/02 |
| | | | 434/350 |
| 2007/0071146 A1 | 3/2007 | Scaglione et al. | |
| 2008/0082786 A1 | 4/2008 | Lovell | |
| 2009/0132345 A1 | 5/2009 | Meyssami et al. | |
| 2010/0030565 A1 | 2/2010 | Holt et al. | |
| 2010/0121684 A1 | 5/2010 | Morio et al. | |
| 2011/0093420 A1 | 4/2011 | Rothenberg et al. | |
| 2011/0161260 A1 | 6/2011 | Burges et al. | |
| 2011/0258049 A1 | 10/2011 | Ramer et al. | |
| 2012/0150888 A1 | 6/2012 | Hyatt et al. | |
| 2012/0215580 A1 | 8/2012 | Barney et al. | |
| 2012/0232955 A1 | 9/2012 | Riazzi et al. | |
| 2012/0254184 A1* | 10/2012 | Choudhary | G06Q 30/0201 |
| | | | 707/738 |
| 2012/0259851 A1* | 10/2012 | Jia | G06Q 30/0242 |
| | | | 707/737 |
| 2012/0290399 A1 | 11/2012 | England et al. | |
| 2012/0296780 A1 | 11/2012 | McEntire | |
| 2012/0316962 A1 | 12/2012 | Rathod | |
| 2013/0097182 A1* | 4/2013 | He | G06F 16/951 |
| | | | 707/748 |
| 2013/0117253 A1* | 5/2013 | Wang | G06F 17/30893 |
| | | | 707/709 |
| 2013/0179449 A1 | 7/2013 | Balcan et al. | |
| 2013/0185218 A1 | 7/2013 | Hermsdorff et al. | |
| 2013/0191299 A1 | 7/2013 | Hermsdorff et al. | |
| 2013/0318180 A1 | 11/2013 | Amin et al. | |
| 2014/0075004 A1 | 3/2014 | Van Dusen et al. | |
| 2014/0089400 A1 | 3/2014 | Yan et al. | |
| 2014/0149244 A1 | 5/2014 | Abhyanker | |
| 2014/0181194 A1 | 6/2014 | Sullivan | |
| 2014/0188564 A1 | 7/2014 | Ghatti et al. | |
| 2014/0195449 A1* | 7/2014 | Komissarchik | G06F 17/30719 |
| | | | 705/319 |
| 2014/0214960 A1 | 7/2014 | Allen et al. | |
| 2014/0229407 A1 | 8/2014 | White | |
| 2014/0230030 A1 | 8/2014 | Abhyanker | |
| 2014/0236723 A1 | 8/2014 | Abhyanker | |
| 2014/0244327 A1 | 8/2014 | Baldwin et al. | |
| 2014/0244335 A1 | 8/2014 | Baldwin et al. | |
| 2014/0280112 A1 | 9/2014 | Cheng et al. | |
| 2014/0304254 A1* | 10/2014 | Rubinstein | H04L 67/22 |
| | | | 707/722 |
| 2015/0127565 A1 | 5/2015 | Chevalier et al. | |
| 2015/0206222 A1 | 7/2015 | Bart et al. | |
| 2015/0332314 A1 | 11/2015 | Chakraborty et al. | |
| 2015/0363827 A1 | 12/2015 | Tseng | |
| 2015/0371277 A1 | 12/2015 | Filiz et al. | |
| 2015/0379445 A1 | 12/2015 | Wang et al. | |
| 2015/0379535 A1 | 12/2015 | Wang et al. | |
| 2016/0065429 A1 | 3/2016 | Wang et al. | |
| 2016/0065628 A1 | 3/2016 | Guo et al. | |
| 2016/0196494 A1 | 7/2016 | Scarr et al. | |

FOREIGN PATENT DOCUMENTS

| | | |
|---|---|---|
| CN | 103827895 A | 5/2014 |
| CN | 105279597 A | 1/2016 |
| WO | WO-201217813 A3 | 12/2012 |
| WO | WO-2012178130 A2 | 12/2012 |
| WO | 2013030830 A1 | 3/2013 |
| WO | WO-2014074607 A2 | 5/2014 |
| WO | WO-2016003512 A1 | 1/2016 |

OTHER PUBLICATIONS

"International Application Serial No. PCT/US2015/023332, Written Opinion dated Jul. 8, 2015", 4 pgs.

"U.S. Appl. No. 14/473,988, Examiner Interview Summary dated Oct. 17, 2016", 3 pgs.

"U.S. Appl. No. 14/473,988, Final Office Action dated Jan. 6, 2017", 19 pgs.

"U.S. Appl. No. 14/473,988, Non Final Office Action dated May 16, 2016", 21 pgs.

"U.S. Appl. No. 14/473,988, Response filed Oct. 17, 2016 to Non Final Office Action dated May 16, 2016", 12 pgs.

"U.S. Appl. No. 14/474,009, Examiner Interview Summary dated Oct. 24, 2016", 3 pgs.

"U.S. Appl. No. 14/474,009, Final Office Action dated Jan. 12, 2017", 24 pgs.

"U.S. Appl. No. 14/474,009, Non Final Office Action dated May 18, 2016", 25 pgs.

"U.S. Appl. No. 14/474,009, Response filed Oct. 18, 2016 to Non Final Office Action dated May 18, 2016", 14 pgs.

"International Application Serial No. PCT/US2015/023332, International Preliminary Report on Patentability dated Jan. 12, 2017", 6 pgs.

Dodaro, Melonie, "Linkedin Contacts: 9 Steps to Using the New Linkedin Contacts", Top Dog Social Media, [Online]. Retrieved from the Internet: http://web.archive.org/web/20130722180326/http://topdogsocialmedia.com/how-to-use-linkedin-contacts>, (Jun. 26, 2013), 10 pgs.

Samuelson, Maisy, "The Linkedin Blog: Now Companies too have profiles on LinkedIn!", Linkedin Corporation, [Online]. Retrieved from the Internet: http://web.archive.org/web/20120111045823/http://blog.linkedin.com/2008/03/20/company-profile/>, (Mar. 20, 2008), 15 pgs.

"U.S. Appl. No. 14/587,047, Non Final Office Action dated Jul. 27, 2017", 24 pgs.

"U.S. Appl. No. 14/473,988, Non Final Office Action dated Nov. 21, 2017", 8 pgs.

"U.S. Appl. No. 14/474,009, Non Final Office Action dated Nov. 20, 2017", 8 pgs.

"U.S. Appl. No. 14/587,047, Final Office Action dated Jan. 10, 2018", 36 pgs.

"U.S. Appl. No. 14/587,047, Response filed Nov. 27, 2017 to Non Final Office Action dated Jul. 27, 2017", 17 pgs.

"Amendment and Response Filed in U.S. Appl. No. 14/473,988", filed Mar. 21, 2018, 11 Pages.

"Applicant Initiated interview Summary in U.S. Appl. No. 14/473,988", dated Jul. 31, 2018, 3 Pages.

"Applicant Initiated Interview Summary in U.S. Appl. No. 14/473,988", dated Mar. 13, 2018, 3 Pages.

"Notice of Allowance Issued in U.S. Appl. No. 14/473,988", dated May 15, 2018, 7 Pages.

"Amendment and Response Filed in U.S. Appl. No. 14/474,009", filed Mar. 8, 2018, 11 Pages.

"Applicant Initiated Interview Summary in U.S. Appl. No. 14/474,009", dated Mar. 7, 2018, 3 Pages.

"Notice of Allowance Issued in U.S. Appl. No. 14/474,009", dated May 7, 2018, 7 Pages.

"Amendment and Response Filed in U.S. Appl. No. 14/587,047", filed Apr. 11, 2018, 20 Pages.

"Non Final Office Action Issued in U.S. Appl. No. 14/587,047", dated Nov. 9, 2018, 22 Pages.

"Examiner Initiated Interview Summary issued in U.S. Appl. No. 14/672,833", dated Jun. 8, 2018, 4 Pages.

"Non Final Office Action Issued in U.S. Appl. No. 14/672,833", dated May 23, 2018, 17 Pages.

"Office Action Issued in Chinese Patent Application No. 201510216483.3", dated Aug. 1, 2018, 33 Pages.

Chen, et al., "Local Community Identification in Social Networks", In Proceedings of the International Conference on Advances in Social Network Analysis and Mining, Jul. 20, 2009, pp. 237-242.

Vasudevan, Mahadevan, "Algorithms for Community Identification in Complex Networks", Retrieved From: https://stars.library.uct.edu/etd/2166/, May 2012, 130 Pages.

(56) References Cited

OTHER PUBLICATIONS

"U.S. Appl. No. 14/473,988, Response filed May 8, 2017 to Final Office Action dated Jan. 6, 2017", 13 pgs.
"U.S. Appl. No. 14/474,009, Response filed May 12, 2017 to Final Office Action dated Jan. 12, 2017", 16 pgs.

* cited by examiner

FIG. 6 http://www.thenet.com/company/5874693

WELCOME, John Smith

Overview | Careers | Follower Statistics | Page Statistics | Insights

Share an update...

Attach a Link    Share With: All Followers ▼    SHARE

All Updates

Check out the new Avocado Sportster in the recent issue of Auto Enthusiast Online Magazine.

January 15, 2012: Auto Enthusiast Avocado Automobile has released a new sportster, with an improved driving range of 750 miles on a single charge... READ MORE High Priority Like  Comment  Share

Financial Analyst Job Opening

Like  Comment  Share

Scott Hansen is now connected to Julie Frankelbun

Like  Comment  Share

Jim Frizzer shared a link:

Google stock drops upon news of Mary Meyer's departure

PEOPLE YOU MAY KNOW

Fred Johnson
CEO, Gadgets, Inc.

John Dangle
Regional Manager
Widgets, Inc.

Silvia Keller
Software Engineer
SBM

MEMBER PROFILE VIEWS

15  Your profile has been viewed by 15 people in the last 7 days

37  You have appeared in search results 37 times in the last 3 days

Your Network

289  Your 289 connections link you to 5,000,000+ professionals.

652
654
660
650

*— 738*

- Direct Connection
- Following
- In Address Book (Contact List)
- In Other (e.g., External) Network
- Attended Common Event
- Network Interaction
  - (e.g., message, share, poll, like, comment, etc.)
- Offsite Interaction
  - (e.g., e-mail, direct tweet, re-tweet, etc.)
- Common Entity
  - (e.g., company, school, group, organization, etc.)
- Historical
  - (e.g., searched for..., viewed profile, viewed content)
- Common Profile Attributes or Characteristics
  - (skill, industry, location, specialties, associations, certifications, professional designations, awards, degree/major/minor)
- Connection at Company
- Alumni at Company
- Recently Joined/Left Company
- Current/Past Employer
- Applied for Positions with Company
- Interacted with Employee at Company
- Viewing history
- In Group
- Group in Network
- Groups being Managed
- Interacted with Group Content

DETERMINING AN ENTITY'S HIERARCHICAL RELATIONSHIP VIA A SOCIAL GRAPH

CROSS-REFERENCE TO RELATED APPLICATIONS

This application claims the benefit of priority of U.S. Provisional Patent Application Ser. No. 62/018,768, filed Jun. 30, 2014, which is incorporated herein by reference in its entirety. This application is related to application Ser. No. 14/587,047, filed on Dec. 31, 2014, which is incorporated by reference herein in its entirety, and is related to Ser. No. 14/672,833, filed Mar. 30 2015, which applications are also incorporated by reference herein in their entirety.

TECHNICAL FIELD

The present disclosure generally relates to data processing systems. More specifically, the present disclosure relates to methods, systems, and computer program products for determining a hierarchical relationship(s) of an entity.

BACKGROUND

Social media and networking websites maintain a wealth of information on companies, organizations, employees, members, entities, groups of members, and the like. The information may involve firmographic information, such as information identifying a headquarters of a company, a hierarchical structure of a company or organization (such as identifying a subsidiary), and the like. Often, some useful firmographic information may be missing or otherwise unavailable.

DESCRIPTION OF THE DRAWINGS

Some embodiments are illustrated by way of example and not limitation in the accompanying drawings, in which:

FIG. 6 is a user interface diagram illustrating an example of a user interface or web page having a personalized data feed (or content stream) via which a member of a social network service may receive communication messages and/or or status updates, according to some embodiments;

FIG. 7 is a table illustrating a non-exhaustive list of associations that may be attributed to an edge connecting two nodes representing entities in the social graph data structure, according to some embodiments of the invention;

FIG. 9 is an example of a user interface for use with a messaging application that implements a method, consistent with some embodiments of the invention;

FIG. 10 is a representation of an example user interface for a team-sharing application, consistent with some embodiments of the invention.

DETAILED DESCRIPTION

Figure 1:
FIG. 1 is a user interface diagram illustrating an example of a user interface or web page for a company represented as an entity in a social graph maintained by a social network service, consistent with some embodiments.

The present disclosure describes methods, systems, and computer program products for determining a hierarchical relationship(s) of an entity. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations, permutations and combinations of the various features and elements described herein.

Generally, the present disclosure describes methods, systems, and computer program products that determine a hierarchical relationship(s) of an entity based on, for example, a social graph. The disclosed techniques may be provided as a social network service, and may be used in conjunction with other social network services and techniques, including social graphs, member profiles, data feeds, and social graph path scoring techniques.

In one example embodiment, entities and units of entities, such as organizations, companies, firms, corporations, subsidiaries, partnerships, and the like, are segmented by general attributes to form candidate related groups. For example, entities having one or more of similar names, similar uniform resource locators (URL's), similar email addresses (including the email addresses of employees or other members of the entity), and the like may be segmented into groups.

Each pair of entities are then analysed to determine if there is a relevant relationship between the pair of entities. A relationship may be measured based on a variety of metrics and the relationship may be considered a relevant relationship if one or more of the metrics exceeds a corresponding threshold.

Social Networks

Online or web-based social network services provide their users with a mechanism for defining, and memorializing in a digital format, their relationships with other people. This digital representation of real-world relationships is frequently referred to as a social graph. As these social network services have matured, many of the services have expanded the concept of a social graph to enable users to establish or define relationships or associations with any number of entities and/or objects in much the same way that users define relationships with other people. For instance, with some social network services and/or with some web-based applications that leverage a social graph that is maintained by a third-party social network service, users can indicate a relationship or association with a variety of real-world entities and/or objects. For example, users may take action to expressly indicate a favorable opinion of, or an interest in, different types of content (e.g., web-based articles, blog postings, books, photographs, videos, audio recordings, music, and so forth). Typically, a user's expression of opinion or interest is captured when a user interacts with a particular graphical user interface element, such as a button, which is generally presented in connection with the particular entity or object and frequently labelled in some meaningful way (e.g., "like," "+1," "follow").

Member Profiles

In addition to hosting a vast amount of social graph data, many social network services maintain a variety of personal information about their members. For instance, with many social network services, when a user registers to become a member, the member is prompted to provide a variety of personal or biographical information, which may be displayed in a member's personal web page. Such information is commonly referred to as personal profile information, or simply "profile information," and when shown collectively, it is commonly referred to as a member's profile. For instance, with some of the many social network services in use today, the personal information that is commonly requested and displayed as part of a member's profile includes a person's age, birthdate, gender, interests, contact information, residential address, home town and/or state, the name of the person's spouse and/or family members, and so forth. With certain social network services, such as some business or professional network services, a member's personal information may include information commonly included in a professional resume or curriculum vitae, such as information about a person's education, the company at which a person is employed, an industry in which a person is employed, a job title or function, an employment history, skills possessed by a person, professional organizations of which a person is a member, and so on.

Social Network Services

Because social network services are a rich source of information about people, social network services are an extremely useful tool when performing certain tasks. For example, many people use social network services to search for, and/or browse, member profiles that exhibit various desired characteristics. For instance, a job recruiter may search for persons who have profiles indicating the possession of certain technical skills and educational and professional experiences and backgrounds. Similarly, when someone needs to hire a person employed in a particular profession (e.g., a general contractor, a doctor, a lawyer, a landscaper, a plumber, an investment banker, and so forth), that person may turn to a social network service to identify persons who possess the requisite skills and qualifications. In another scenario, a person may desire to contact someone for the purpose of exploring or proposing the possibility of a particular business arrangement or relationship. Accordingly, the person may use a social network service to identify the appropriate persons to contact.

Social Graphs

A social graph may be implemented with a specialized graph data structure in which various entities (e.g., people, companies, schools, government institutions, non-profits, and other organizations) are represented as nodes connected by edges, where the edges have different types representing the various associations and/or relationships between the different entities. Although other techniques may be used, with some embodiments, the social graph data structure may be implemented with a graph database. Accordingly, if a member of the social network service with the name Jeffrey Beaner graduated from Princeton University, this particular association may be represented in the social graph data structure by a node representing the member, Jeffrey, being connected via an edge to another node representing the entity or organization, Princeton University, where the particular edge type indicates the specific type of association—in this case, Jeffrey's status as a graduate of Princeton University. Consequently, at least with some embodiments, an organization may have a presence within a social graph of a social network service without necessarily having any particular web-based content that is hosted by the social network service.

Example User Interface

FIG. 1 is a user interface diagram illustrating an example of a user interface or web page for a company represented as an entity in a social graph maintained by a social network service, consistent with some embodiments. As illustrated in FIG. 1, the example web page is for a company with the name "Avocado." In this example, a representative of Avocado has established what might be referred to as a company page 130 with the social network service. In this example, the company page 130 for Avocado is hosted by the social network service. Accordingly, members of the social network service who may be interested in the company can access the company page 130 for Avocado to view a variety of information about the company. For example, the company page 130 for Avocado may present a brief history of the company as well as an overview of the products and services that the company provides. The company page 130 for Avocado may present information about various job listings for open employment positions with the company, for example, in connection with the "Careers" tab in FIG. 1. In connection with the "Follower Statistics" tab, the company page 130 may present statistical information about the members of the social network service who are following the company, or who are subscribed to receive messages or status updates on behalf of the company. Such information generally may include the total number of company followers, the total number of new company followers within some predefined number of days (e.g., last seven days), the number of messages or status updates published on behalf of the company within the same predefined number of days, and so forth. In addition to follower statistics, with some embodiments, the company page 130 may present page statistics, such as the total number of company page 130 views, the number of company page 130 views within some predefined number of days (e.g., last seven days), and/or the number of page or link selections (e.g., clicks) within the same predefined number of days.

With some embodiments, the company page 130 may include various insights about the company as derived from member profile information and the viewing member's social graph. For example, in connection with the "Insights" tab in the example web page of FIG. 1, a viewing member may be presented with information identifying members of the social network service who are employed at Avocado and who have new job titles, or information about members who have recently departed Avocado for a new company. In one example embodiment, information within the company page 130 may be used to prioritize communications. For example, a communication from an employee of a company who is a client of a recipient may be given a higher priority level.

Social Graph Connections

Consistent with embodiments of the invention, some of the many tasks people commonly use a social network service to perform are improved by conveying to a user of the service specific information concerning the associations (e.g., relationships and affiliations) that a user, or an entity on whose behalf the user is acting (e.g., a company, group or other organization with which the user is associated), might share in common with another member of the social network service, while the user is performing a particular task. In one example embodiment, an association of members of the social graph may be utilized to determine a hierarchical relationship of an entity, as described more fully below. For example, techniques for analyzing a social graph to identify connection paths connecting a user (or, some other entity) with another member of the social network service, and then to present a visual representation of those connection paths that are determined to be the strongest or best suited for a particular purpose, may be useful in a number of services. While social graphs used by many conventional social network services model only the relationships that exist between people, embodiments of the present invention use a social graph that may include not only people, but other types of entities as well. For example, a social graph may include entity types such as companies, educational institutions, groups, and so forth. As such, a connection path in the social graph that connects two members may be based on a wide variety of associations between the various entities, including personal relationships between members, a common employment relationship with a particular company, common membership in a group, and so forth. Such connection paths may be utilized to determine a hierarchical relationship(s) of an entity, as described more fully below.

A social network service may maintain a social graph, implemented as a graph data structure having nodes and edges, where the nodes represent different entities and the edges represent various associations or relationships between entities. For example, with some embodiments, the entity types may include people, companies, educational institutions (e.g., schools and universities), and groups (e.g., online groups, or professional organizations), among others. Accordingly, the edges that connect any two nodes (entities) may represent types of associations between the entities, and may therefore depend, in part, on the entities involved. For example, an edge connecting two nodes that represent people may be representative of a specific type of relationship between the two people, including a direct, bilateral connection between the two people. An edge connecting a first node, representing a person, with a second node, representing a company, may be representative of an employment relationship (current or previous) between the person and the company. In addition to the edges having a particular type, representative of the nature of the relationship between two entities, each edge connecting two entities may be assigned an edge score to reflect the strength, or relevance, of the particular association.

Consistent with some embodiments, when a communication is received, the social network service (e.g., specifically, the pathfinder module) may perform an algorithmic process to analyze the social graph and to identify the connection paths that connect the recipient of the communication with the sender of the communication, such as a user or other entity that is a member of the social network service. The connection path or paths that are determined to be strongest, or most relevant, with respect to the communication, may then be visually presented to the user, providing the user with important contextual information for completing the task, and/or may be used to determine a hierarchical relationship(s) of an entity, as described more fully below. In the specific context of a digital messaging application, the terms "communication sender" and "communication recipient" are used herein. While a communication recipient is the member to whom a communication is addressed, a communication sender is the user performing the task of preparing and sending a communication on his or her own behalf, or on behalf of an entity, such as a company, group or other organization.

Figure 2:
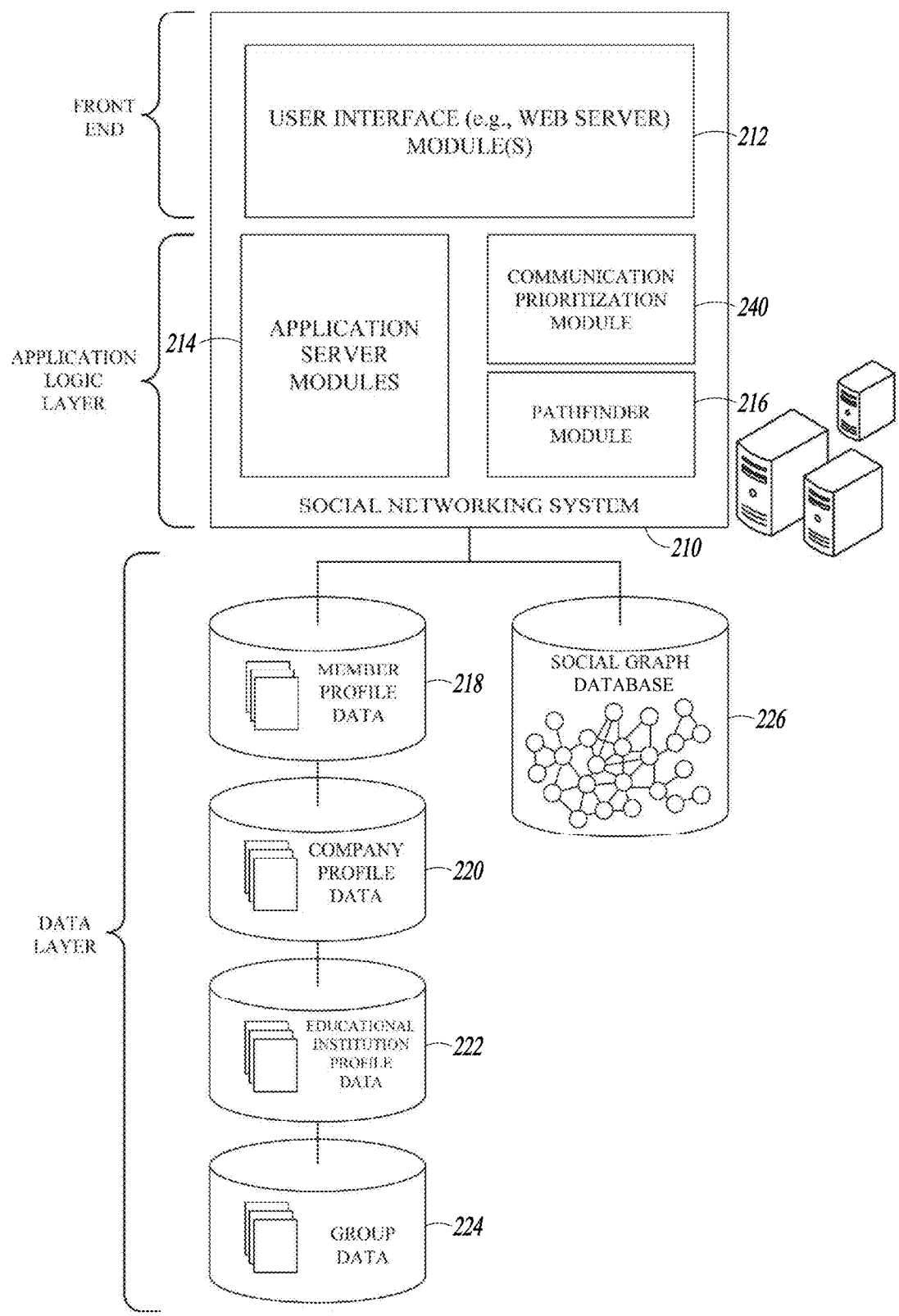
FIG. 2 is a block diagram illustrating various functional components of a social networking system with a pathfinder module and a communication prioritization module for use with a wide variety of applications and, specifically, for prioritizing communications, consistent with some embodiments of the invention.

FIG. 2 is a block diagram illustrating various functional components of a social networking system 210 with a pathfinder module 216 and a communication prioritization module 240 for use with a wide variety of applications and, specifically, for determining a hierarchical relationship(s) of an entity, consistent with some embodiments of the invention. As shown in FIG. 2, the social networking system 210 may be generally based on a three-tiered architecture, consisting of a front-end layer, application logic layer, and data layer. As is understood by skilled artisans in the relevant computer and Internet-related arts, each module or engine shown in FIG. 2 may represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, a skilled artisan will readily recognize that various additional functional modules and engines may be used with a social network system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although depicted in FIG. 2 as a three-tiered architecture, the inventive subject matter is by no means limited to such architecture.

As shown in FIG. 2, the front end consists of a user interface module (e.g., a web server) 212, which may receive requests from various client-computing devices, and communicates appropriate responses to the requesting client devices. For example, the user interface module(s) 212 may receive requests in the form of Hypertext Transport Protocol (HTTP) requests, or other web-based, application programming interface (API) requests. The client devices (not shown) may be executing conventional web browser applications or applications that have been developed for a specific platform to include any of a wide variety of mobile devices and operating systems.

As shown in FIG. 2, the data layer may include several databases, including databases for storing data for various entities of the social graph, including member profiles 218, company profiles 220, educational institution profiles 222, and information concerning various online or offline groups 224. In addition, the graph data structure may be implemented with a social graph database 226, which is a particular type of database that uses graph structures with nodes, edges, and properties to represent and store data. Of course, with various alternative embodiments, any number of other entities might be included in the social graph, and as such, various other databases may be used to store data corresponding with other entities.

Member Registration

Consistent with some embodiments, when a person initially registers to become a member of the social network service, the person may be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in member profiles 218.

Once registered, a member may invite other members, or may be invited by other members, to connect via the social network service. A "connection" may call for a bi-lateral agreement by the members, such that both members acknowledge the establishment of the connection. Similarly, with some embodiments, a member may elect to "follow" another member. In contrast to establishing a "connection," the concept of "following" another member typically may be a unilateral operation, and at least with some embodiments, may not call for acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph. Various other types of relationships that may exist between different entities, and represented in the social graph database 226, are described in connection with FIG. 7.

The application logic layer includes various application server modules 214, which, in conjunction with the user interface module(s) 212, may generate various user interfaces (e.g., web pages) with data retrieved from various data sources in the data layer. With some embodiments, individual application server modules 214 may be used to implement the functionality associated with various applications, services and features of the social network service. For instance, a messaging application, such as an email application, an instant messaging application, or some hybrid or variation of the two, may be implemented with one or more application server modules 214. A search engine enabling users to search for and browse member profiles may be implemented with one or more application server modules 214.

Member Connections

In addition to the various application server modules 214, the application logic layer may include the pathfinder module 216 and the communication prioritization module 240. As illustrated in FIG. 2, with some embodiments, the pathfinder module 216 may be implemented as a service that operates in conjunction with various application server modules 214. For instance, any number of individual application server modules 214 and/or communication prioritization module 240 may invoke the functionality of the pathfinder module 216, to include an application server module 214 associated with a messaging application and/or an application server module 214 associated with an application to facilitate the viewing of member profiles 218. However, with various alternative embodiments, the pathfinder module 216 may be implemented as its own application server module 214 such that it operates as a stand-alone application. With some embodiments, the pathfinder module 216 may include or have an associated publicly available API that enables third-party applications to invoke the functionality of the pathfinder module 216.

Generally, the pathfinder module 216 may take as input parameters that, at a minimum, identify two different nodes corresponding with two entities (e.g., two persons, or a person and a company, etc.) in a social graph that may be implemented with a graph data structure (e.g., social graph database 226). Using the input parameters, the pathfinder module 216 may analyze the social graph database 226 to identify the connection paths in the social graph that connect the two entities, if any exist. With some embodiments, additional input parameters may be provided to the pathfinder module 216 and may be used to refine the connection paths selected for potential presentation to the user. These parameters may include, for example, filtering criterion to include or exclude connection paths having particular entities, or particular entity types, or specific edge types. Once the set of connection paths satisfying the input parameters has been identified, the pathfinder module 216 may derive a path score for each connection path, for example, by aggregating the individual edge scores for the edges that connect the different nodes included in the connection paths. Finally, the pathfinder module 216 may provide the information corresponding with the connection paths to the application that invoked the pathfinder module 216 so that a visual representation of one or more connection paths may be presented to the user.

The pathfinder module 216 may be invoked from a wide variety of applications. In the context of a messaging application (e.g., email application, instant messaging application, or some similar application), the pathfinder module 216 may be invoked to provide a message sender with a visual representation of a connection path between the message sender and a person to whom the message sender has addressed a message (e.g., the message recipient). Similarly, the pathfinder module 216 may be invoked to provide a message sender with a visual representation of a connection path connecting an entity on whose behalf the message sender is acting (e.g., company, group, or other organization) with a message recipient. In one example embodiment, the pathfinder module 216 may be invoked to provide a path score corresponding to a connection path connecting a sender of a communication and a recipient of a communication for use in determining a hierarchical relationship(s) of an entity.

Social Graph Data Structure

Figure 3:
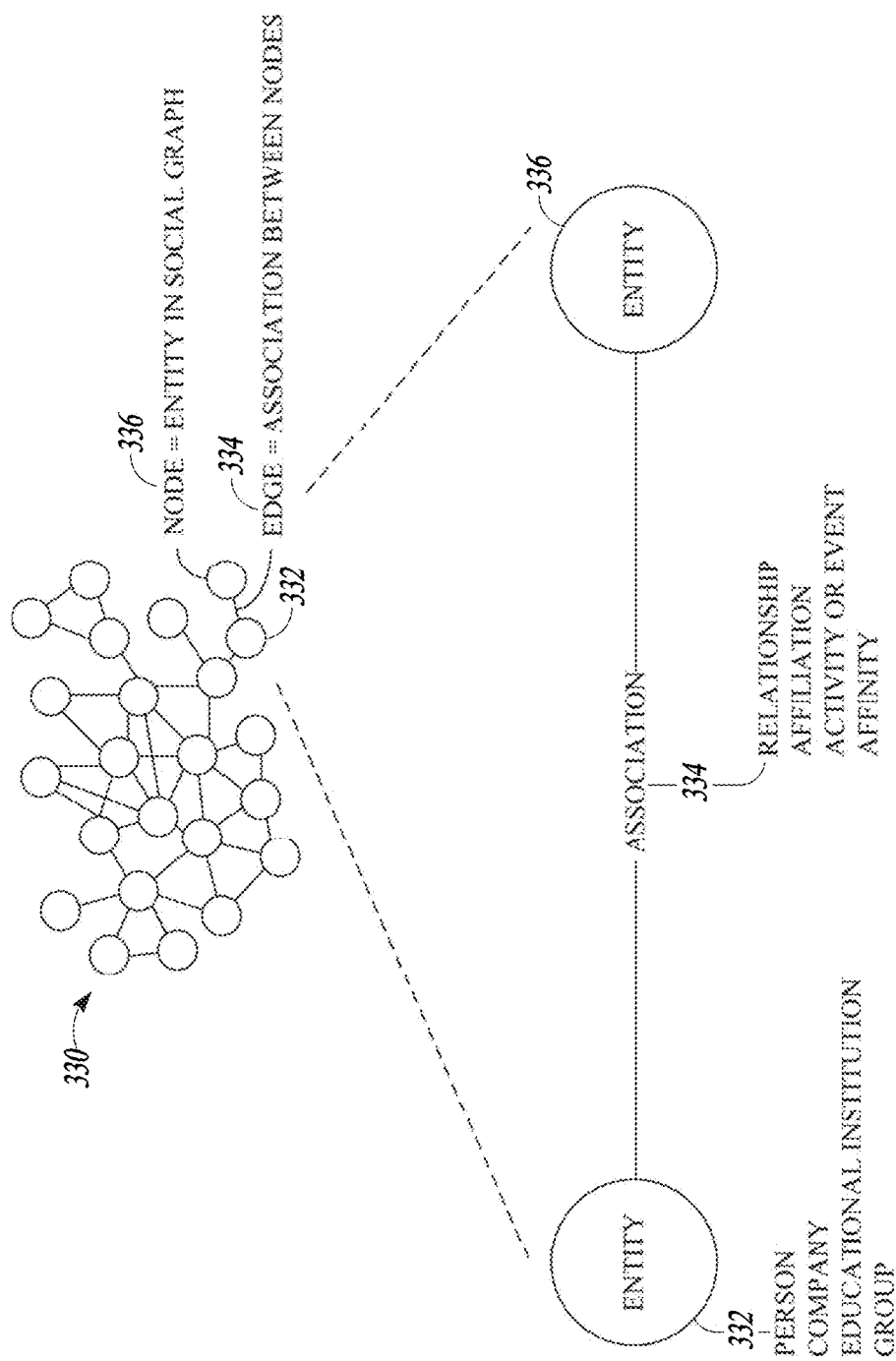
FIG. 3 is a block diagram illustrating an example of a portion of a graph data structure for implementing a social graph, according to some embodiments of the invention.

FIG. 3 is a block diagram illustrating an example of a portion of a graph data structure 330 for implementing a social graph, according to some embodiments of the invention. As illustrated in FIG. 3, the graph data structure 330 may consist of nodes connected by edges. For instance, a node 332 may be connected to a node 336 by means of an edge 334. Each node in the graph data structure 330 may represent an entity in the social graph. With some embodiments, any number of entity types may be included in the social graph. For example, as illustrated in FIG. 3, the entity types that may exist in one implementation of a social graph that is consistent with an embodiment of the invention are: a person, a company, an educational institution (e.g., college, school or university), and a group (e.g., an online group, hosted by the social network service, or some other third party server system, or, a real-world organization, such as a professional organization.) The edges 334 that connect any two nodes 332, 336 may represent a wide variety of different associations. For example, in general, an edge 334 may represent a relationship, an affiliation, an activity or event, or some other affinity shared in common between two entities. Although not exhaustive, the various associations presented in the table of FIG. 7 represent some of the many associations that may be mapped to the edges 334 of a graph data structure 330 to indicate the association between entities in a social graph of a social network service, consistent with some embodiments of the invention.

Example Relationship Identification Application

In one example embodiment, a variety of hierarchical relationships between entities can be discovered and identified. In one type of hierarchical relationship, the relationship between an organization's headquarters, such as headquarters of a corporation or company, and a branch unit of the organization can be identified (e.g., Acme Corporation and Acme Corporation China). In one example embodiment, the names of the organization's headquarters and the branch unit may be similar in one or more aspects. In one type of hierarchical relationship, the relationship between different units of an entity (such as organizations, companies, firms, corporations, subsidiaries, partnerships, and the like), where the units have dissimilar names, may be discovered and identified (e.g., a relationship between YouTube and Google). In one type of hierarchical relationship, the relationship between a holding or parent company and a child company may be discovered and identified (e.g., Berkshire Hathaway and Geico). In one example embodiment, duplicate companies are identified and redundant relationships are excluded or deleted.

In one example embodiment, the entities, such as organizations, companies, firms, corporations, subsidiaries, partnerships, and the like, may be comprised of groups or sub-units. The groups/sub-units are segmented by general attributes to form candidate related groups/sub-units. For example, groups/sub-units with one or more of similar names, similar uniform resource locators (URL's), similar email addresses (including the email addresses of employees or other members of the entity), and the like may be segmented into candidate related groups/sub-units. In one example embodiment, an editing distance of URL's may be determined to identify similar URL's and, thereby, identify the groups/sub-units that may be related.

Each pair of groups/sub-units are then analysed to determine if there is a relevant relationship between the pair of groups/sub-units. A relationship may be measured based on a variety of metrics and the relationship may be considered a relevant relationship if one or more of the metrics exceeds a corresponding threshold. For example, a connection density ratio may be utilized to determine if a relationship is relevant.

A connection may be defined, for example, as a relationship between two people, entities, and the like. In one example embodiment, only bi-lateral relationships, i.e., relationships acknowledged by both people in the relationship, are considered. In one example embodiment, relationships acknowledged by only one person in the relationship and/or relationships that have not been acknowledged by people in the relationship are considered. The potential number of connections is the maximum number of connections that a person, entity, and the like may have. For example, in terms of person-to-person relationships, the potential number of connections for a selected person is equal to the count of people, excluding the selected person. A connection density ratio for a selected person may be defined, for example, as the actual number of connections of the selected person divided by the potential number of connections for the selected person.

The connection density ratio of a group of people may be defined, for example, as the actual number of unique connections between all people within the group divided by the potential number of unique connections between each pair of people within the group. The potential number of unique connections between each pair within the group is equal to n factorial (n!, where n is the number of people in the group).

The connection density ratio between a first group of people and a second group of people may be defined, for example, as the actual number of unique connections between each person within the first group to every person in the second group divided by the potential number of unique connections between each person within the first group and each person in the second group. For example, the connection density ratio may be determined by dividing the average connection density between each member of the first group (such as an employee of the first group) to a member in the second group (such as an employee of the second group) by the maximum number of potential unique connections between members of the two groups. The maximum number of potential unique connections between members of the two groups may be determined by multiplying the count of employees in the first group by the count of employees in the second group. In one example embodiment, if the connection density ratio exceeds a defined threshold, the first and second groups have a relevant relationship. In one example embodiment, if the ratio increases at a rate above a defined threshold, the first and second departments are considered to have a relevant relationship.

A relevant relationship may be indicative of certain organizational information, such as firm information. For example, a metric that exceeds a corresponding threshold may indicate that the two entities are likely to have a parent-subsidiary relationship. In one example embodiment, the parent entity may be determined by, for example, comparing the count of members of each group/sub-unit. The group/sub-unit with the largest count of members may be assumed to be the parent entity, such as parent company. In one example embodiment, the profiles of members of the first and second groups/sub-units may be mined in search of information indicative of the relationship. For example, a member's profile may recite that the second group/sub-unit is a subsidiary of the first group/sub-unit.

In one example embodiment, the sources for mapping may be accessed in the following order:
1) crowd sourcing;
2) account hierarchy information from a sales force service;
3) data (e.g., Hadoop data) provided by owners of company pages (e.g., web pages);
4) Parent company table; and
5) URL (universal resource locator) algorithm.

For example, crowd sourcing may be provided via a web interface that allow users to provide hierarchy data. Crowd sourcing may be used to verify the model and technique(s) for determining the hierarchical relationship(s) of an entity. The parent company table may be, for example, company hierarchy data manually collected through research. unit.

Figure 4A:
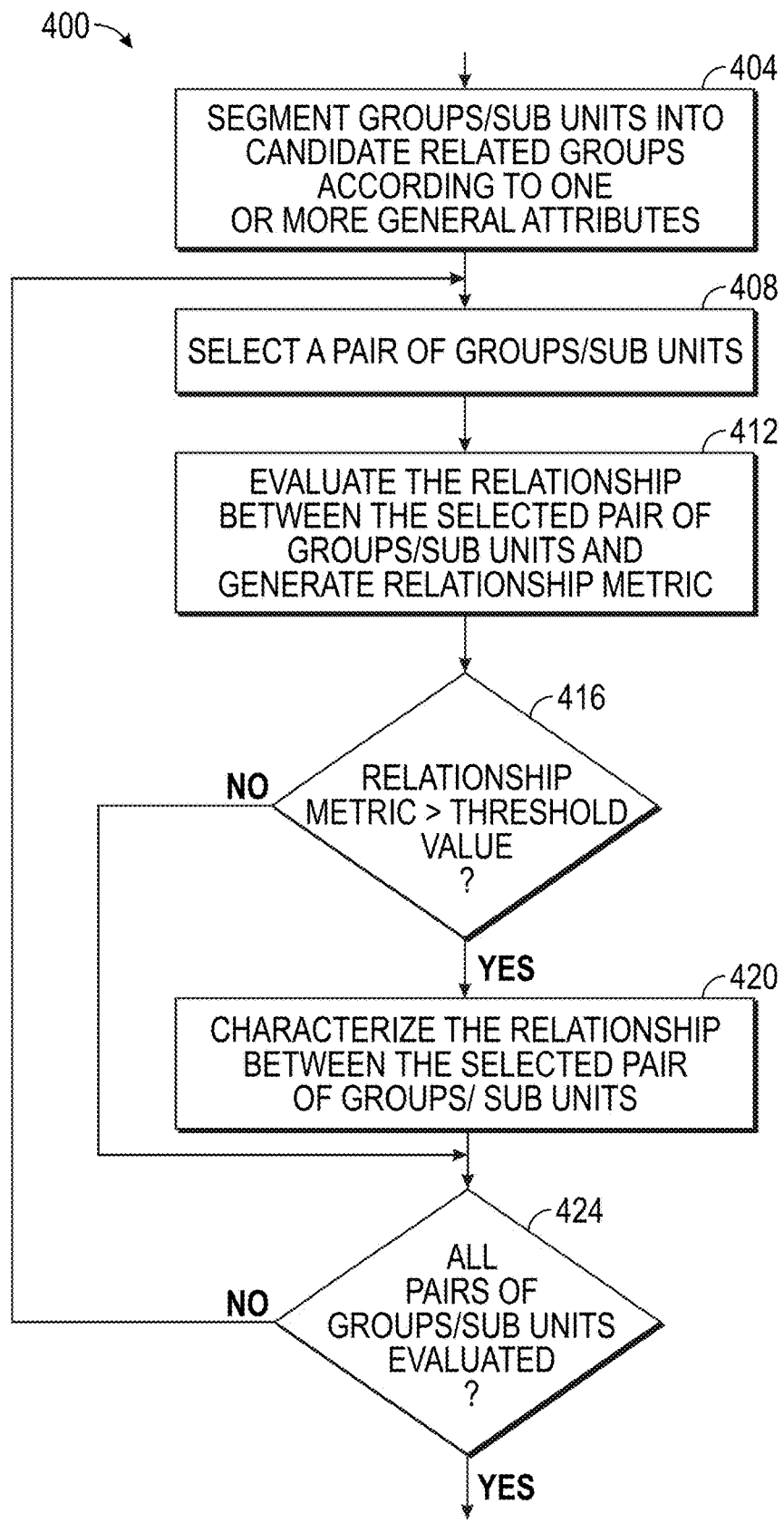
FIG. 4A shows a flowchart for an example method for determining a relationship between groups of an entity, in accordance with an example embodiment.

FIG. 4A shows a flowchart for an example method 400 for determining a relationship between entities, in accordance with an example embodiment. The entities may be, for example, organizations, companies, firms, corporations, subsidiaries, partnerships, departments, and the like. As noted above, the entities may be comprised of groups or sub-units. In one example embodiment, groups/sub-units are segmented by general attributes to form candidate related groups/sub-units (operation 404). For example, the groups/sub-units with one or more of similar names, similar uniform resource locators (URL's), similar email addresses (including the email addresses of employees or other members of the entity), and the like may be segmented into a group/sub-unit.

A pair of groups/sub-units is then selected (operation 408). The relationship between the selected pair of groups/sub-units is evaluated and a relationship metric is generated (operation 412). The generated relationship metric is compared to a threshold value (operation 416). If the relationship metric is greater than the threshold value, the relationship is a relevant relationship and the relationship is characterized accordingly (operation 420); otherwise, the method 400 proceeds with operation 424.

During operation 424, a test is performed to determine if all pairs of groups/sub-units have been processed. If all pairs of groups/sub-units have not been processed, the method 400 proceeds with operation 408; otherwise, the method 400 may end.

Figure 4B:
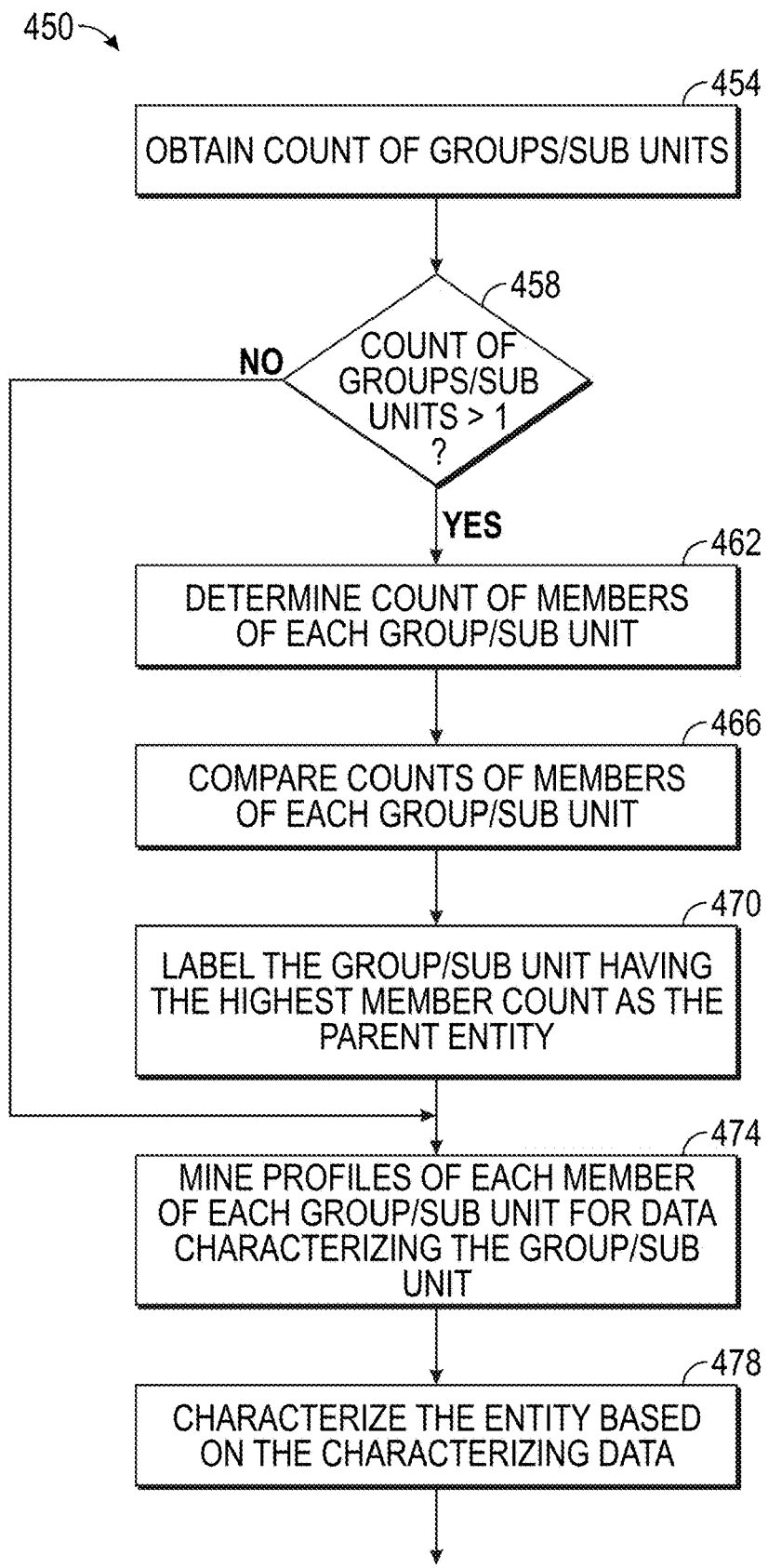
FIG. 4B shows a flowchart for an example method for characterizing an entity, in accordance with an example embodiment.

FIG. 4B shows a flowchart for an example method 450 for characterizing an entity, in accordance with an example embodiment. In one example embodiment, a count of groups/sub-units is obtained (operation 454) and a test is performed to determine if the count of groups/sub-units is greater than one (operation 458). If the count of groups/sub-units is greater than one, the method 450 proceeds with operation 462; otherwise, the method 450 proceeds with operation 474.

During operation 462, a count of members of each of the groups/sub-units is determined. A comparison of the count of members of each of the groups/sub-units is then performed in operation 466. The group/sub-unit having the largest member count is characterized as the parent entity (operation 470).

In one example embodiment, profiles of each member are mined for information related to a characterization of the member's corresponding group/sub-unit (operation 474), and the entity(ies) are characterized according to the mined information (operation 478). For example, a profile of a member may indicate that the member is an employee of Company A, and may indicate that Company A is a subsidiary of Company B. Company A may therefore be characterized as the subsidiary of Company B and Company B may be characterized as the parent of Company A.

Data Feeds and Content Streams

A data feed or content stream may be known, to those skilled in the art, by a variety of different names, including a "stream," "status update stream," "network update stream," and/or "news feed." Similarly, skilled artisans may refer to this type of message by many different names, including a "status update," "tweet," or simply, and generically, as a message. In one example embodiment, high priority communications may be identified in a data feed and/or a content feed. For example, as described more fully below, a message that specifies an action by a recipient may be identified in a data feed. In another example embodiment, when an authorized representative of an organization publishes a status update, the status update may appear in a content stream presented on the web page of the particular organization on whose behalf the status update is being published. Additionally, the status update may appear in a personalized content stream of those members of the social network service who have taken some action to subscribe to receive messages published on behalf of the organization.

Figure 5:
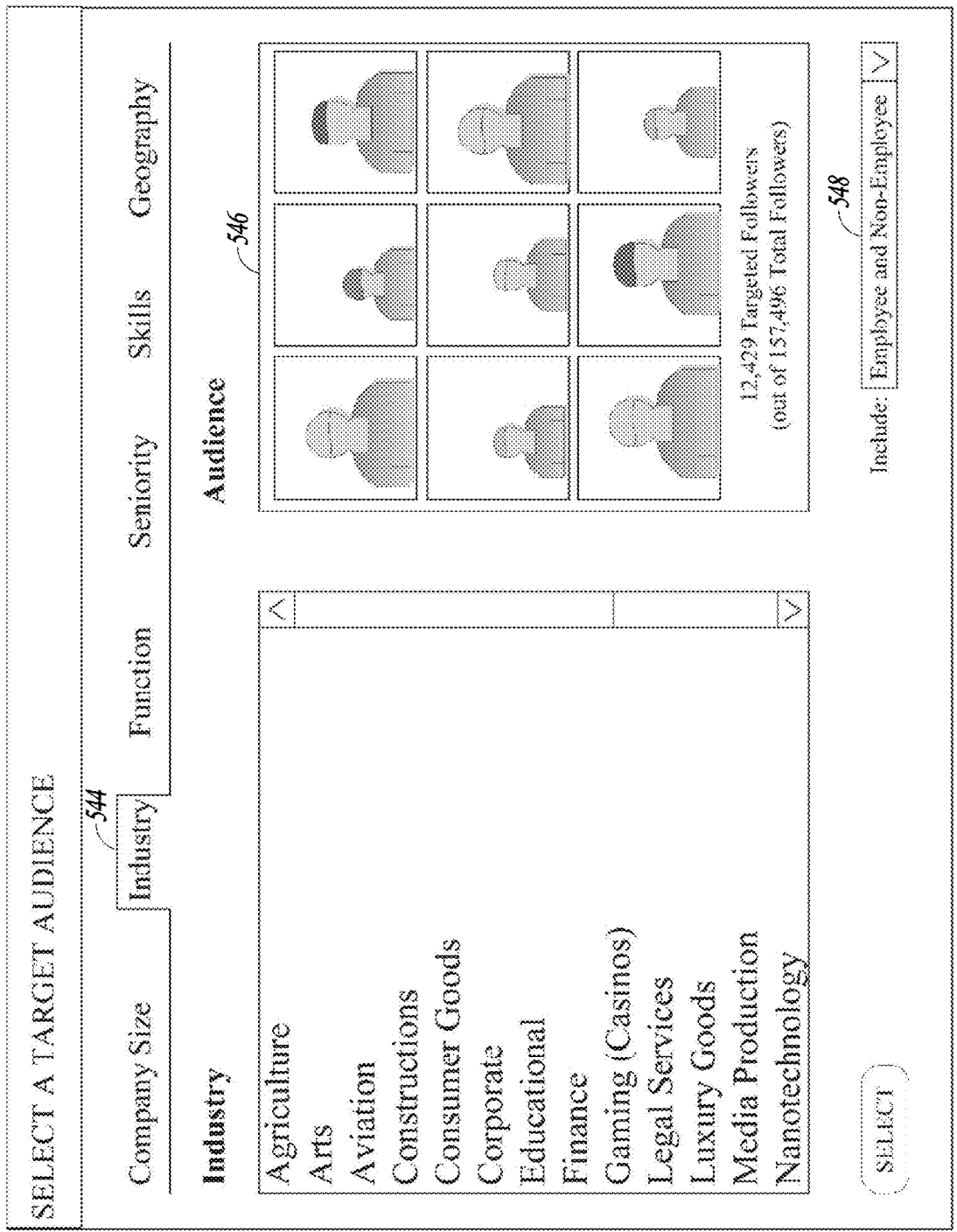
FIG. 5 is a user interface diagram illustrating an example of a user interface or web page enabling a company representative to publish a message or status update, consistent with some embodiments of the invention.

Returning to FIG. 1, various items of content are shown in separate content modules. In the portion of the example user interface with reference number 132, the company page 130 may present a user interface for a data feed or content stream (e.g., a company updates stream), via which messages or status updates published on behalf of the company may be presented. With some embodiments, the content that is presented in the company updates stream may be a combination of content that has been automatically generated by some application or service of the social network service, and content that has been published by an administrator or representative of the company who has been granted the authority to publish content on behalf of the company. With some embodiments, the messages or status updates that may be published on behalf of the company may be visible to all members of the social network service via the company page 130, regardless of whether a member is following the particular company and regardless of whether the member possesses the particular member profile attributes selected as targeting criteria by the author of the content, when the message or status update was initially published. With some alternative embodiments, status updates in the company updates stream may only be visible to those members of the social network service who are following the company and/or possess the member profile attributes selected as targeting criteria by the publisher of the status update. The messages or status updates published on behalf of the company may only appear in a member's personal data feed or content stream if the member has subscribed to receive messages (e.g., if the member is following the company), and the member possesses the member profile attributes that have been selected as targeting criteria by the publisher of the status update when publishing the message. In one example embodiment, the published messages or status updates may be prioritized in accordance with the prioritization techniques described more fully below. For example, a message comprising a job opportunity may be given a high priority if the recipient is a follower of the company and has indicated an interest in employment opportunities. With some embodiments, the author can select as targeting criteria whether a message or status update should be communicated to employees, non-employees, or both employees and non-employees of the company on whose behalf the message or status update is being published, as depicted in FIG. 5. For example, if an author of a message being published on behalf of Avocado would like the message to be received only by employees of the company, the author can select "Employees", thereby limiting the audience to only employees of the company.

Example User Interface: Data Feed

FIG. 6 is a user interface diagram illustrating an example of a user interface 650 or web page having a personalized data feed (or content stream) via which a member of a social network service may receive communication messages and/or status updates 654, according to some embodiments. In the example user interface 650 of FIG. 6, a content module 652 may represent a personalized data feed or content stream for a member of the social network service with the name John Smith. In this example, not only does the content stream present content selected specifically for John Smith, the content stream itself may be presented within a user interface or a web page that is personalized for John Smith. With some embodiments, a personalized data feed or content stream has various configuration settings associated with it that may enable the user to specifically filter or select the type of content the member desires to view in the personalized content stream. With some embodiments, high priority communications may be identified in the personalized data feed or content stream. For example, as noted above, a message 660 comprising a job opportunity may be given a high priority if the recipient has indicated an interest in employment opportunities.

Social Graph: Path Score

Consistent with some embodiments of the invention, for each connection path connecting a sender to a recipient of a communication, a path score may be derived to reflect the overall connection strength (or relevance) of the path connecting the sender and the recipient. For example, with some embodiments, the path score may be derived by simply aggregating (e.g., summing, or otherwise combining with an algorithm or formula) the individual edge scores that correspond with the edges 334 connecting the nodes 332, 336 that ultimately connect the sender and the recipient. As described in greater detail below, a variety of algorithms may be used to derive the individual edge scores for a particular edge 334 and/or edge type connecting any two nodes 332, 336 in the social graph. For example, with some embodiments, various weighting factors may be applied to influence (e.g., increase or decrease) the edge score for a particular edge type (e.g., the type of association existing between two nodes 332, 336 in the social graph), based on the particular task for which the connection paths are being identified and presented. With some embodiments, once the various connection paths connecting a sender of a communication or some user-specified entity to a recipient of a communication have been identified and ordered or ranked by path score, a visual representation of the connection path having the highest path score may be presented to the user. With some embodiments, a visual representation of several independent connection paths may be presented. With some embodiments, the path score may be used to prioritize communications received by a recipient, as described more fully below.

Messaging

In the context of a messaging application, and particularly a web-based messaging application, consistent with some embodiments of the invention, when a message sender has addressed a message to another member of the social network service (e.g., a message recipient), the message sender may be presented with a visual representation of the best connection path or paths connecting the message sender to the message recipient, as determined by analysis of the social graph maintained by the social network service. With some embodiments, the algorithm used to derive the path scores for the various connection paths connecting the message sender to the message recipient may be selected based on an inferred type of communication, or an explicitly selected type of communication. With some embodiments, the social network service may use machine learning techniques and/or various algorithms to infer the type of communication (e.g., the purpose or reason the message sender is communicating with the message recipient), and then, based on this information, a particular algorithm for deriving the path scores may be selected. With some embodiments, the message sender may explicitly select or otherwise specify the type of communication, such that the selected communication type will influence the algorithm used to derive the path scores for the connection paths connecting the message sender with the message recipient. By tailoring the algorithm that is used to derive the path scores to a specific task (e.g., sending a message) and/or a specific context for a task (e.g., a type of communication for the task of sending a message), the most relevant connection path(s) may be presented to the user, based on the task and context in which the task is being performed.

With some embodiments, the visual representation of the best connection path or paths (e.g., the connection path or paths with the highest path scores) may be automatically embedded or otherwise included in the content of a message being prepared by the message sender. In one example embodiment, the path score corresponding to the connection path or paths with the highest path scores is embedded or otherwise included in the content of a message. Consequently, when the message recipient receives the message, the message recipient may determine the best connection path or paths connecting the message sender with the message recipient and/or may view a visual representation of the best connection path or paths connecting the message sender with the message recipient. Alternatively, the connection path or paths may be determined and/or may be presented in a manner that allows the message sender to simply reference the relevant information when the message sender is composing the message. For instance, with some embodiments, the visual representation of the connection path may be presented as a separate element of a graphical user interface displayed when the message sender is composing the message. Similarly, the visual representation of the connection path or paths may be presented to a message recipient, not as part of a received electronic message, but instead as part of a separate user interface element that is presented when the message recipient is accessing and viewing the electronic message. In either case, by identifying and then presenting information indicating how the message sender and message recipient are associated or related (e.g., connected via the social graph), the message recipient is more likely to be receptive to receiving, reading, and replying to the message, and the message is more easily prioritized. This is particularly beneficial in an environment where people are frequently overloaded with information and are receiving hundreds of messages per day. With some embodiments, the path score embedded or otherwise included in the content of a message may be utilized to prioritize a communication, as described more fully below.

Referring to FIG. 7, a table 738 illustrates a non-exhaustive list of associations that may be attributed to an edge 334 connecting two nodes 332, 336, representing entities, in the social graph data structure. Various edge types or associations may be applicable to all combinations of entity types, while others may be applicable to only a certain subset of combinations of entity types. For example, an edge type representing a "following" relationship may connect two nodes 332, 336, where each node 332, 336 represents a person, and the edge 334 connecting the two nodes 332, 336 may indicate that one person is following the other. Similarly, an edge 334 representing a "following" relationship may connect a first node 332, representing a person, with a second node 336, representing a company, to indicate that the person is following the company. Accordingly, the edge type for a "following" relationship may apply to the entity type "person" as well as "company." Some other associations may only be meaningful when applied to an edge 334 connecting certain types of entities.

Some of the various associations or edge types shown in FIG. 7 may indicate a particular relationship that exists between two entities represented by nodes 332, 336 in the graph data structure. For instance, two members of the social network service may be directly connected, one member may be following another, one member may be in an address book or contacts list of another, two members may be co-managing a group or co-inventors on a patent, and so forth. In each of these examples, the association or edge type may be assigned to the edge 334 connecting the two nodes 332, 336 representing the two entities (e.g., person, company, educational institution, group, etc.).

Some of the various associations or edge types shown in FIG. 7 may indicate an activity that is shared in common between two entities, or an activity that involves two entities. For example, a first member may have communicated a message to a second member. A first member may have re-tweeted or forwarded some content item (e.g., a tweet) that was originally generated by a second member. A first member may share an item of content with a second member or comment on an item of content posted by a second member, and so forth.

A third category of associations may generally involve what may be thought of as affiliations. For instance, a first member may be affiliated with a second member based on membership in the same group. Similarly, two members may be, or, have been, employed with the same company at different times, or simultaneously. Two members may be affiliated based on having attended the same school or university, and so on.

Another general category of associations or edge types involves what are referred to herein as affinities. For instance, two members may be associated based on an affinity or similarity of profile attributes, such as the same general geographic location, skills shared in common, employment in the same industry, common degrees or majors, and the like. The various associations or edge types that may be assigned to an edge 334 connecting two nodes 332, 336 in a graph data structure 330 presented in FIG. 7 are simply some of the many examples. In various alternative embodiments of the invention, different associations (not shown in FIG. 7) may also be used, particularly with embodiments of the invention that have additional entity types other than the specific examples presented herein (e.g., person, company, educational institution, group).

Figure 8:
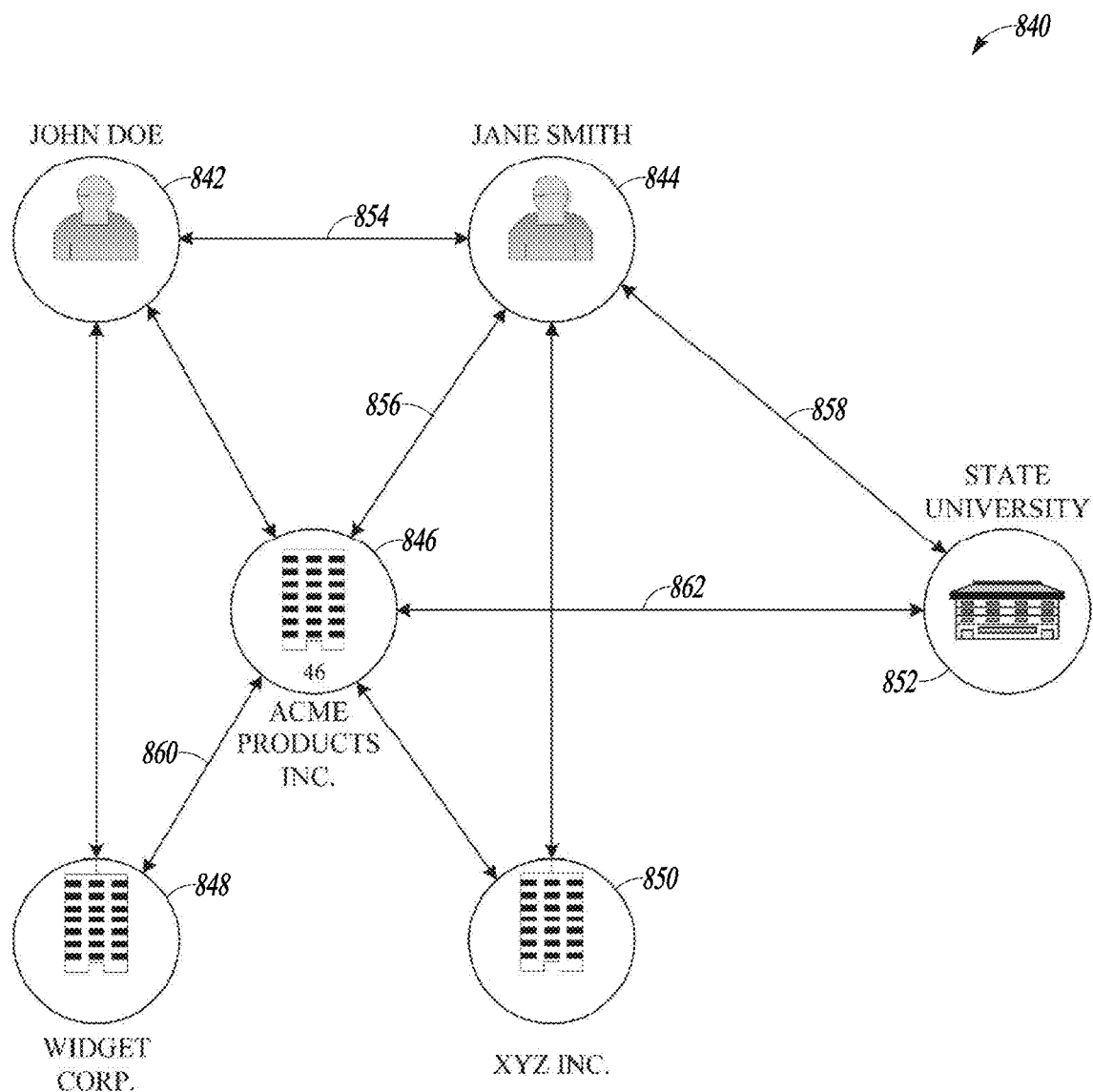
FIG. 8 is a diagram illustrating an example of a generalized social graph containing nodes representing several different entities having varying entity types including members, companies, and schools.

FIG. 8 is a diagram illustrating an example of a generalized social graph 840 containing nodes representing several different entities, having varying entity types including members, companies, and schools. Member nodes include John Doe 842 and Jane Smith 844. Company nodes include ACME Products Inc. 846, Widget Corp. 848, and XYZ Inc. 850. There is one school node, State University, with reference number 852. The social graph 840 may contain edges connecting nodes representing entities of either the same or different types. For example, there is an edge 854 connecting John Doe 842 with Jane Smith 844, reflecting the fact that John Doe 842 and Jane Smith 844 are directly connected to each other. This edge 854 may be assigned an edge score or weight indicating the strength of the connection between John Doe 842 and Jane Smith 844. For example, with some embodiments, the weight may be computed using a measure of the overlap between the member connections in John's network and Jane's network. That is, for two members M1 and M2, W(M1, M2)=Conn(M1, M2)/SQRT[Conn(M1)*Conn(M2)] where W(M1, M2) denotes the weight of the edge connecting M1 and M2, Conn(M1, M2) may denote the number of direct member connections that M1 and M2 have in common, Conn(M1) may denote the total number of direct member connections in M1's network, and Conn(M2) may denote the total number of direct member connections in M2's network. Alternatively, the weight for this edge 854 may be determined based on a statistical estimate of the probability that John and Jane know each other, or by other algorithms or techniques or combinations thereof.

Referring again to FIG. 8, there is an edge 856 connecting Jane Smith 844 to ACME Products Inc. 846, which represents Jane's affiliation with ACME Products Inc. 846, as the executive chairman and founder of the company. The score or weight assigned to this edge 856 may indicate the strength of this affiliation. For example, with some embodiments, the weight may be computed based on the overlap between Jane's network and the network of ACME Products Inc. 846, where the node in the social graph 840 representing ACME Products Inc. 846 is connected to each member who is a current or former employee of the company. That is, for a member M1 and a company C1, W(M1, C1)=Conn(M1, C1)/SQRT[(Conn(M1)*Conn(C1)] where W(M1, C1) may denote the weight of the edge 334 connecting M1 and C1, Conn(M1, C1) may denote the number of members M1 is connected to who are also current or past employees of C1, Conn(M1) denotes the total number of connections in M1's network, and Conn(C1) may denote the total number of members who are current or past employees of C1. Similarly, there is an edge 858 connecting Jane Smith 844 to State University 852, which represents Jane's affiliation with State University 852 as an alumnus of the university. The weight of this edge 858 may indicate the strength of this affiliation. For example, the weight of an edge 334 connecting a member M1 and a school S1 could be computed as W(M1, S1)=Conn(M1, S1)/Conn(M1), where Conn(M1, S1) may denote the number of members M1 is connected to who are also students or alumni of S1, and Conn(M1) may denote the total number of member connections in M1's network.

There is an edge 860 connecting ACME Products Inc. 846, with Widget Corp. 848, which represents the association between the two companies. An association between two companies may exist for a variety of reasons (for example, if they share a common founder, if some members of the social network service have been employed at both companies, if one company is a subsidiary of the other, or if the two companies are business partners). In this particular example, ACME Products Inc. 846 and Widget Corp. 848 are connected because a large number of former Widget Corp. 848 employees are currently employed with ACME Products Inc. 846. The weight of the edge 860 may denote the strength of the association. For example, the weight of an edge 334 connecting two companies C1 and C2 could be computed as W(C1, C2)=Conn(C1, C2)/SQRT[Conn(C1)*Conn(C2)], where Conn(C1, C2) may denote the number of members who have worked at both C1 and C2, and Conn(C1) and Conn(C2) may denote the number of members who have worked at C1 and C2 respectively. Similarly, there is an edge 862 connecting ACME Products Inc. 846 with State University 852, which represents the association between the company and the school. This association may exist for a variety of reasons (for example, if graduates of the school or students at the school are employed by the company). Again, the weight assigned to the edge 862 may indicate the strength of the association. For example, the weight of an edge 334 connecting a company C1 with a school S1 could be computed as W(C1, S1)=Conn(C1, S1)/SQRT[(Conn(C1)*Conn(S1)], where Conn(C1, S1) may denote the number of members employed by company C1 who attend or have attended school S1, Conn(C1) denotes the number of members employed by C1, and Conn(S1) may denote the total number of members who attend or have attended S1.

Directed Social Graph

With some embodiments, the social graph 840 may be a directed graph. For example, in a social network where members can follow and receive updates from other members, each edge 334 connecting the nodes representing two members may be a directed link from the followed member to the following member. The followed member may send messages to the following member, but the following member cannot send messages to the followed member. Alternatively, a social network may contain bi-directional connections between members, but an edge 334 connecting two nodes 332, 336 may have different weights depending on the direction. For example, the chief executive officer (CEO) of a company could be connected to an engineer, with the CEO having greater influence on the engineer than vice versa. With other embodiments, the social graph 840 may be an undirected graph, in which all connections between entities are bidirectional, and each edge 334 in the graph has equal weight in both directions. Accordingly, with some embodiments, the weight assigned to a particular edge 334 may influence the measure of connection strength between two nodes 332, 336 in general, and a particular connection path specifically.

Member Connection Algorithm

Accordingly, with some embodiments of the invention, after identifying a set of connection paths connecting a communication sender with a communication recipient, the pathfinder module (e.g., pathfinder module 216 of FIG. 2) may generate a path score for each connection path identified. With some embodiments, the path score for each individual connection path may be dependent upon the individual edge scores assigned to the edges 334 connecting the nodes 332, 336 in the connection path. With some embodiments of the invention, different algorithms may be automatically used to derive path scores for different applications or tasks. The particular algorithm used to derive the path score may be automatically and dynamically selected, for example, based on a determination of what the user is attempting to achieve. Alternatively, with some embodiments, the user may make an explicit selection (e.g., by specifying a type or category of message, or a purpose for contacting someone), which will then influence the algorithm used to derive the path scores. Consequently, the edge scores or weights for different edge types may be derived differently, for example, to increase or decrease the influence of edge scores of certain types of edges 334 on the path score, depending upon the particular application that has invoked the pathfinder module 216, or a particular task or process being undertaken or performed.

Messaging

The pathfinder module 216 may be used with an email application, an instant messaging (IM) application, a text or SMS (short message service) text messaging application, or even certain telephone or voice communication systems to include any of a variety of voice over IP (VoIP) based services. Similarly, the pathfinder module 216 may be implemented for use with applications that use any of a variety of network or computing models, to include web-based applications, client-server applications, or even peer-to-peer applications. With some embodiments, the messaging application may be a service that is integrated with the social network service, and thus hosted by the same entity that operates the social network service and the pathfinder service. Alternatively, the pathfinder service may be accessible (e.g., via an API) to third-party applications that are hosted by entities other than the entity that operates the social network service.

Figure 9:
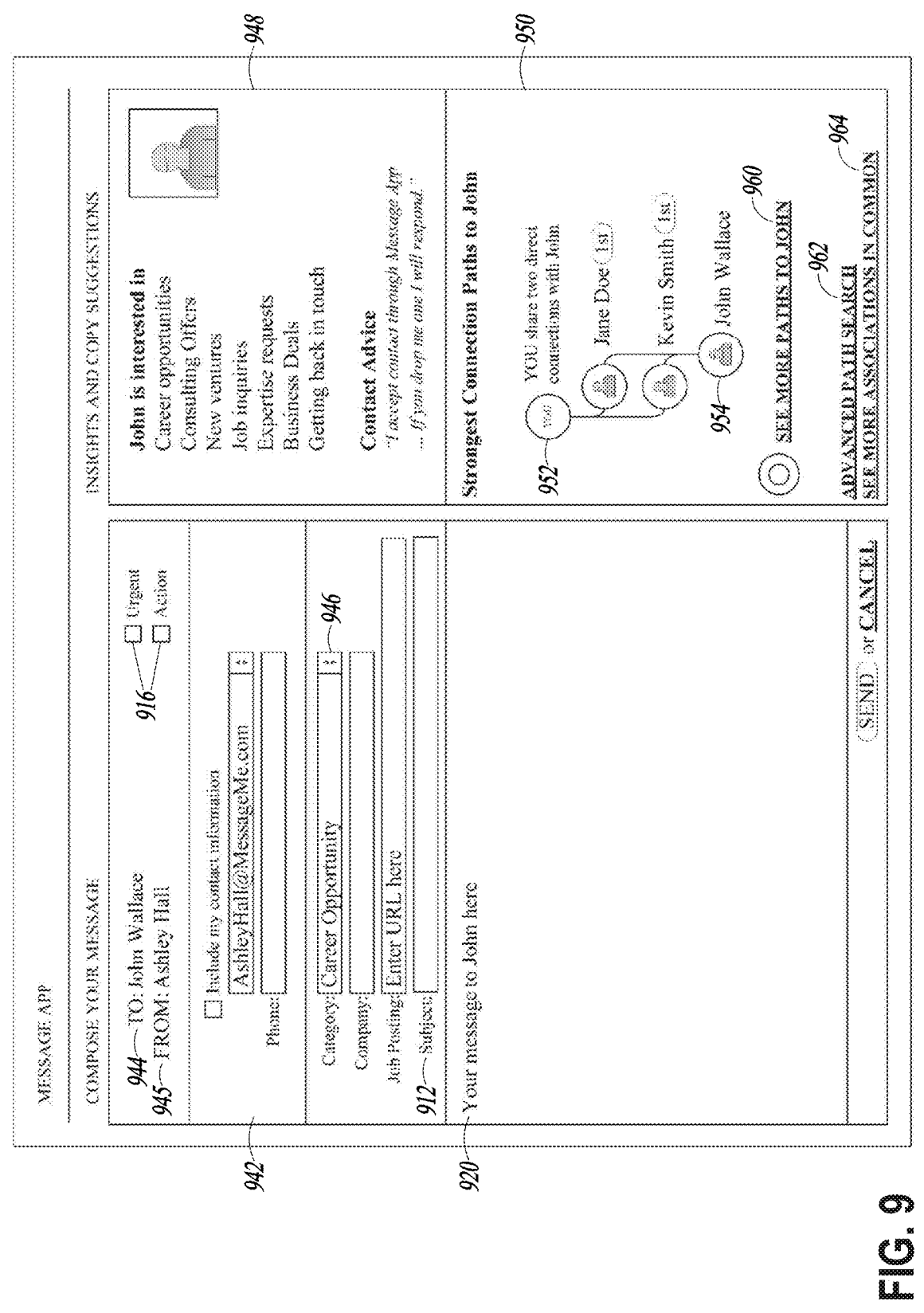

FIG. 9 is an example of a user interface for use with a messaging application that implements a method, consistent with some embodiments of the invention. In the example user interface of FIG. 9, a window pane 942 may include a text input box 944 for specifying the identity (e.g., name, email address, phone number, etc.) of a person to whom a message 920 is to be communicated. In addition, various other user interface elements for inputting or providing information may be presented. Specifically, a drop down box 946 may enable the message sender to specify a category of message that is to be communicated to the message recipient. In one example embodiment, a sender can mark a communication as urgent or specify an action (reference number 916). With some embodiments, the category of message selected by the message sender may influence the algorithm used to derive path scores for the different connection paths that connect the message sender to the message recipient. Upon specifying the identity of the message recipient, and optionally the category of message, the messaging application may present information about the message recipient, for example, as shown in a window pane 948. In addition, the pathfinder module 216 may identify the strongest connection paths between the message sender and the message recipient, and present a visual representation of the strongest connection paths. For example, a window pane 950 may include a visual representation of the strongest connection paths—that is, the connection paths with the highest path scores—connecting the message sender, Ashley Hall 952, with the message recipient, John Wallace 954, via two mutual connections, Jane Doe and Kevin Smith. As described more fully below, the path score may be used to prioritize a communication.

Example Team-sharing Application

In one example embodiment, a team-sharing application may enable a team to establish an environment in which to share information and provide for communications between team members. The team-sharing environment may be oriented around team members and relationships. In one example embodiment, only team members may have access to the team-sharing environment. In one example embodiment, invited guests may also have access to the team-sharing environment and/or access to the environment may be unrestricted.

Figure 10:
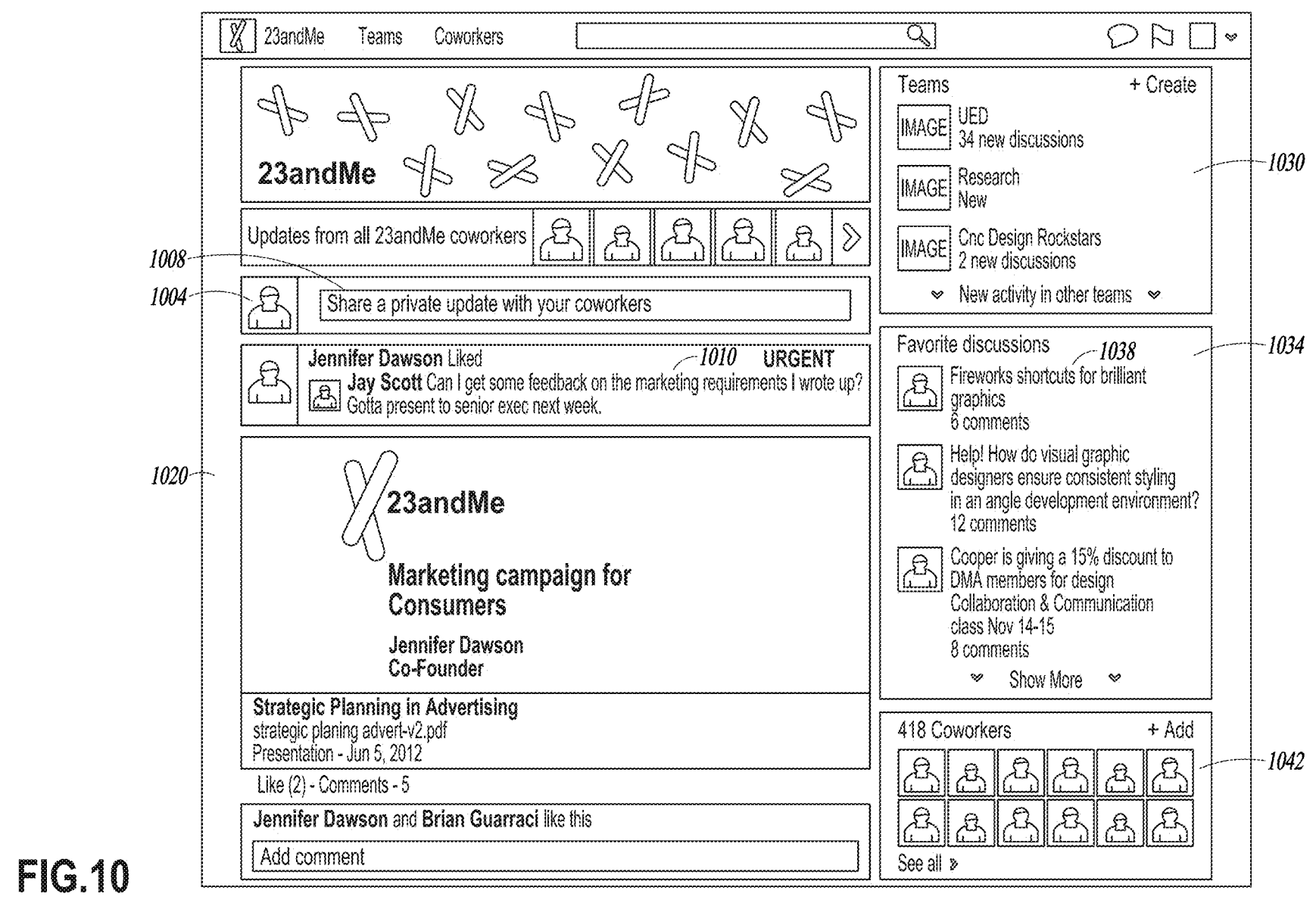

FIG. 10 is a representation of an example user interface for a team-sharing application, consistent with some embodiments of the invention. In one example embodiment, a team content feed 1020 is generated to provide status updates, notifications, and/or alerts to team members. A comment entry field 1008 may enable a user to enter a comment into the content feed 1020, or send a comment to a specific user or group of users. For example, comment 1010 may be entered into the team content feed 1020 via the comment entry field 1008.

A team interface 1030 may display one or more teams accessible by a user for team sharing. For example, a Research team may comprise members interested in research topics related to an organization or corporation. A favorite discussions interface 1034 may provide access to one or more active discussions that may be of interest to the user. The favorite discussions interface 1034 may display the latest comment(s) that have been added to each of the discussions. One or more of the discussions may correspond to one of the teams identified in the team interface 1030.

A co-worker interface 1042 may display thumbnail pictures representing one or more co-workers of a user. A thumbnail picture may be selected to retrieve the profile of the associated co-worker and/or to create a message 920 for the selected co-worker.

In one example embodiment, the team members may be inferred from a member profile, connections, and activities, and the importance of an information item shared with team members may be determined based on the experience, skills, relationships, and actions of one or more of the team members.

In one example embodiment, a team member may post the status of a work item, such as the status of a collaborative presentation, on the team content feed 1020. In another example, an activity may automatically generate a posting to the team content feed 1020. For example, the uploading of a computer program to a database may automatically generate a posting to the team content feed 1020 indicating that the computer program is available for testing. The posting may appear on the team content feed 1020 of all team members, or may appear on the team content feed 1020 of a subset of the team members. For example, a posting that a computer program is available for testing may only appear on the team content feed 1020 of team members who are also members of a software-testing department. In one example embodiment, a team member may issue questions or requests via a team content feed 1020 to another team member, or to a plurality of team members.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

Figure 11:
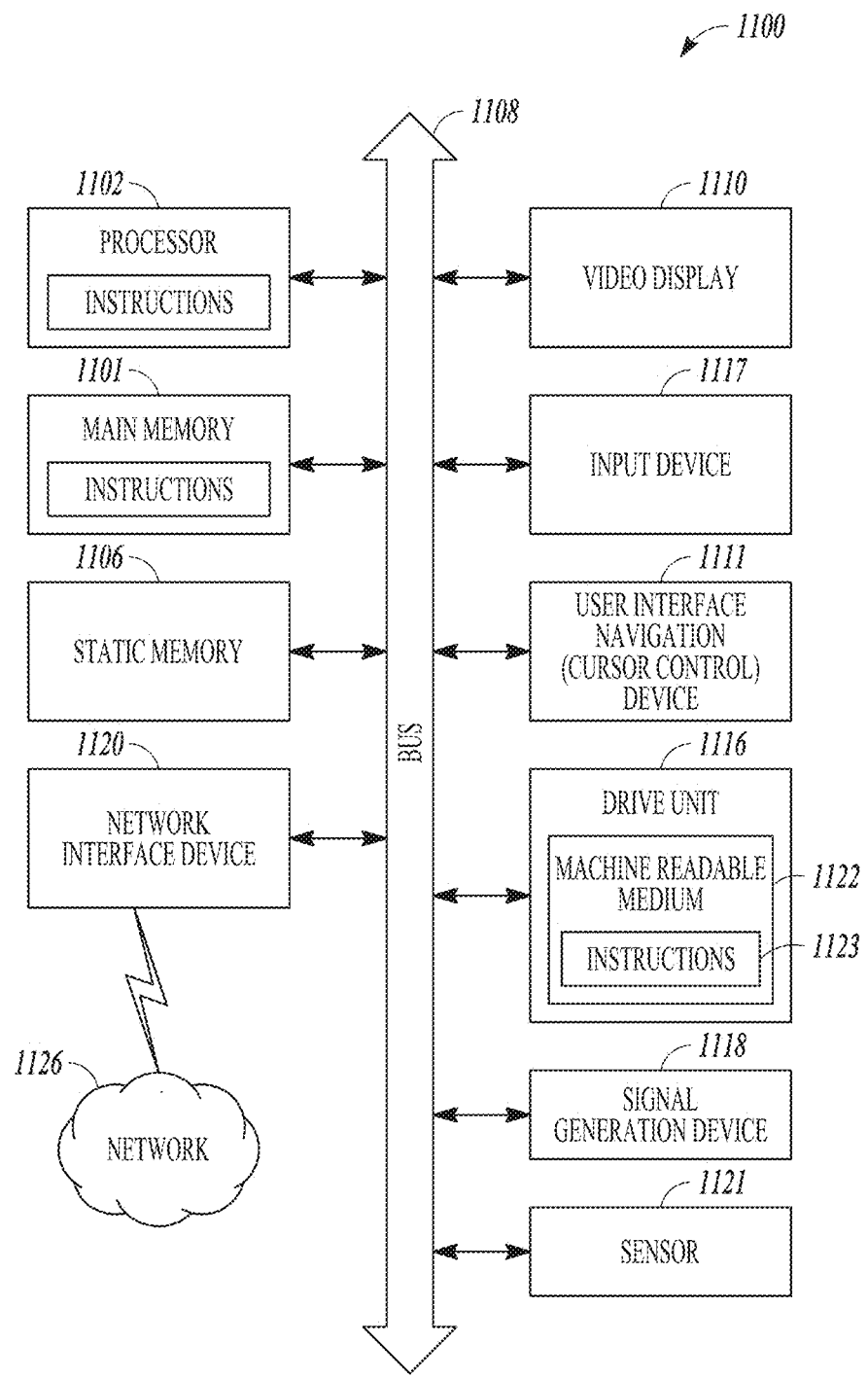
FIG. 11 is a block diagram of a machine in the form of a computing device within which a set of instructions may be executed for causing the machine to perform any one or more of the methodologies discussed herein.

FIG. 11 is a block diagram of a machine in the form of a computer system 1100 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In an example embodiment, the machine will be a server computer. However, in alternative embodiments, the machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1101 and a static memory 1106, which communicate with each other via a bus 1108. The computer system 1100 may further include a video display unit 1110, an alphanumeric input device 1117 (e.g., a keyboard), and a user interface (UI) navigation device 1111 (e.g., a mouse). In one embodiment, the video display unit 1110, input device 1117 and user interface navigation device 1111 are a touch screen display. The computer system 1100 may additionally include a storage device (e.g., drive unit) 1116, a signal generation device 1118 (e.g., a speaker), a network interface device 1120, and one or more sensors 1121, such as a global positioning system sensor, compass, accelerometer, or other sensor.

The drive unit 1116 includes a machine-readable medium 1122 on which is stored one or more sets of data structures and instructions 1123 (e.g., software) embodying or utilized by any one or more of the methodologies or functions described herein. The instructions 1123 may also reside, completely or at least partially, within the main memory 1101 and/or within the processor 1102 during execution thereof by the computer system 1100, with the main memory 1101 and the processor 1102 also constituting machine-readable media 1122.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1123. The term "machine-readable medium" shall also be taken to include any tangible medium that is capable of storing, encoding or carrying instructions 1123 for execution by the machine and that cause the machine to perform any one or more of the methodologies of the present invention, or that is capable of storing, encoding or carrying data structures utilized by or associated with such instructions 1123. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically-erasable programmable read-only memory (EEPROM), and flash memory devices; magnetic disks such as internal hard disks and removable disks; magneto-optical disks; and CD-ROM and DVD-ROM disks.

The instructions 1123 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi® and WiMax® networks). The term "transmission medium" shall be taken to include any intangible medium that is capable of storing, encoding or carrying instructions 1123 for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for identifying a hierarchical relationship of an entity, comprising:
    receiving a communication from a communication sender or the entity, the communication being addressed to a communication recipient;
    segmenting sub-units of the entity into one or more candidate related groups in a groups database based on one or more general attributes, each of the entity and the sub-units being a type of organization, wherein the sub-unit having the largest count of members is determined to be a parent entity;
    selecting a pair of the sub-units of one of the candidate related groups;
    analyzing, using a hardware processor, the pair of sub-units to determine a hierarchical relationship of the entity based on information contained in one or more profiles of members of a social networking service, the information related to the sub-units and one or more relationships between the sub-units;
    identifying the hierarchical relationship of the entity based on the determined hierarchical relationship; and
    presenting, through a user interface, a visual representation of a connection path between the communication sender or the entity, and the communication recipient, the connection path being determined at least in part based on the hierarchical relationship.

2. The method of claim 1, wherein the general attribute is a name of the sub-unit, a uniform resource locator, and an electronic mail address.

3. The method of claim 1, wherein the hierarchical relationship is a relevant hierarchical relationship based on one or more metrics exceeding a corresponding threshold.

4. The method of claim 3, wherein the metric is a connection density ratio.

5. The method of claim 1, wherein the hierarchical relationship is a parent-subsidiary relationship.

6. The method of claim 1, wherein members of two sub-units are well connected based on a connection density ratio being above a threshold value.

7. A non-transitory machine-readable storage medium comprising instructions that, when executed by one or more processors of a machine, cause the machine to perform operations comprising:
    receiving a communication from a communication sender or an entity, the communication being addressed to a communication recipient;
    segmenting sub-units of the entity into one or more candidate related groups in a groups database based on one or more general attributes, each of the entity and the sub-units being a type of organization, wherein the sub-unit having the largest count of members is determined to be a parent entity;
    selecting a pair of the sub-units of one of the candidate related groups;
    analyzing, using a hardware processor, the pair of sub-units to determine a hierarchical relationship of the entity based on information contained in one or more profiles of members of a social networking service, the information related to the sub-units and one or more relationships between the sub-units;
    identifying the hierarchical relationship of the entity based on the determined hierarchical relationship; and
    presenting, through a user interface, a visual representation of a connection path between the communication sender or the entity, and the communication recipient, the connection path being determined at least in part based on the hierarchical relationship.

8. The non-transitory machine-readable storage medium of claim 7, wherein the general attribute is a name of the sub-unit, a uniform resource locator, and an electronic mail address.

9. A system for identifying a hierarchical relationship of an entity, the system comprising:
    a processor;
    memory to store instructions that, when executed by the processor cause the processor to:
        receive a communication from a communication sender or the entity, the communication being addressed to a communication recipient;
        segment sub-units of the entity into one or more candidate related groups in a groups database based on one or more general attributes, each of the entity and the sub-units being a type of organization, wherein the sub-unit having the largest count of members is determined to be a parent entity;
        select a pair of the sub-units of one of the candidate related groups;
        analyze, using a hardware processor, the pair of sub-units to determine a hierarchical relationship of the entity based on information contained in one or more profiles of members of a social networking service, the information related to the sub-units and one or more relationships between the sub-units; and
        identify the hierarchical relationship of the entity based on the determined hierarchical relationship; and
        present, through a user interface, a visual representation of a connection path between the communication sender or the entity, and the communication recipient, the connection path being determined at least in part based on the hierarchical relationship.

10. The system of claim 9, wherein the general attribute is a name of the sub-unit, a uniform resource locator, and an electronic mail address.

11. The system of claim 9, wherein the hierarchical relationship is a relevant hierarchical relationship based on one or more metrics exceeding a corresponding threshold.

12. The system of claim 11, wherein the metric is a connection density ratio.

13. The system of claim 9, wherein the hierarchical relationship is a parent-subsidiary relationship.

14. The system of claim 9, wherein members of two sub-units are well connected based on a connection density ratio being above a threshold value.

15. The method of claim 1, comprising:
    identifying connection paths in a social graph database that connect the communication sender or the entity and the communication recipient;

filtering the connection paths for potential presentation; and
deriving a path score for each connection path;
wherein the presenting of the visual representation of the connection path is based on the path score.

* * * * *

UNITED STATES PATENT AND TRADEMARK OFFICE
CERTIFICATE OF CORRECTION

PATENT NO. : 10,523,736 B2  
APPLICATION NO. : 14/672948  
DATED : December 31, 2019  
INVENTOR(S) : Wang et al.

Page 1 of 1

It is certified that error appears in the above-identified patent and that said Letters Patent is hereby corrected as shown below:

On the Title Page

On page 2, in Column 1, under "Foreign Patent Documents", Line 3, delete "WO-201217813" and insert --WO-2012178130-- therefor On page 2, in Column 2, under "Other Publications", Line 22, delete ""Linkedin" and insert --"LinkedIn-- therefor On page 2, in Column 2, under "Other Publications", Line 23, delete "Linkedin" and insert --LinkedIn-- therefor On page 2, in Column 2, under "Other Publications", Line 27, delete "Linkedin" and insert --LinkedIn-- therefor On page 2, in Column 2, under "Other Publications", Line 28, delete "Linkedln!"," and insert --LinkedIn!",-- therefor In the Claims In Column 22, Line 32, in Claim 9, delete "organization." and insert --organization,-- therefor Signed and Sealed this  
Twenty-sixth Day of May, 2020

Andrei Iancu  
*Director of the United States Patent and Trademark Office*